(12) United States Patent
Ono et al.

(10) Patent No.: US 8,911,127 B2
(45) Date of Patent: Dec. 16, 2014

(54) LIGHTING DEVICE FOR VEHICLE

(71) Applicant: Honda Motor Co., Ltd., Tokyo (JP)

(72) Inventors: Kazuhiko Ono, Wako (JP); Yoji Kanaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 13/900,540

(22) Filed: May 23, 2013

(65) Prior Publication Data
US 2014/0009953 A1 Jan. 9, 2014

(30) Foreign Application Priority Data
Jul. 3, 2012 (JP) .................................. 2012-149802

(51) Int. Cl.
*F21S 8/10* (2006.01)
*B62J 6/00* (2006.01)
*B60Q 1/34* (2006.01)
(52) U.S. Cl.
CPC .................. *F21S 48/22* (2013.01); *B62J 6/005* (2013.01); *B60Q 1/34* (2013.01); *F21S 48/2206* (2013.01)
USPC ........................................................ 362/520

(58) Field of Classification Search
USPC .................. 362/509, 520, 521, 522, 545, 235
See application file for complete search history.

(56) References Cited

U.S. PATENT DOCUMENTS 2,911,524 A * 11/1959 Falge et al. .................. 362/273

FOREIGN PATENT DOCUMENTS

JP          03-18281 Y2     8/1987

* cited by examiner

*Primary Examiner* — Joseph L Williams
(74) *Attorney, Agent, or Firm* — Mori & Ward, LLP

(57) ABSTRACT

A lighting device for a vehicle includes a lens, a housing, an engaging part, and an engaged part. The engaging part and the engaged part are configured to be a state in which the lens is fixed in a predetermined position by turning the lens by a predetermined angle with respect to the housing after the lens and the housing are fitted in a direction of an optical axis of the lens. An inside of the lens abuts, by screwing the fastening member to the housing when the lens is fixed in the predetermined position, on an end of the fastening member so that turning of the lens is disenabled even if it is tried to turn the lens in a direction in which the lens is disengaged from the housing.

8 Claims, 12 Drawing Sheets

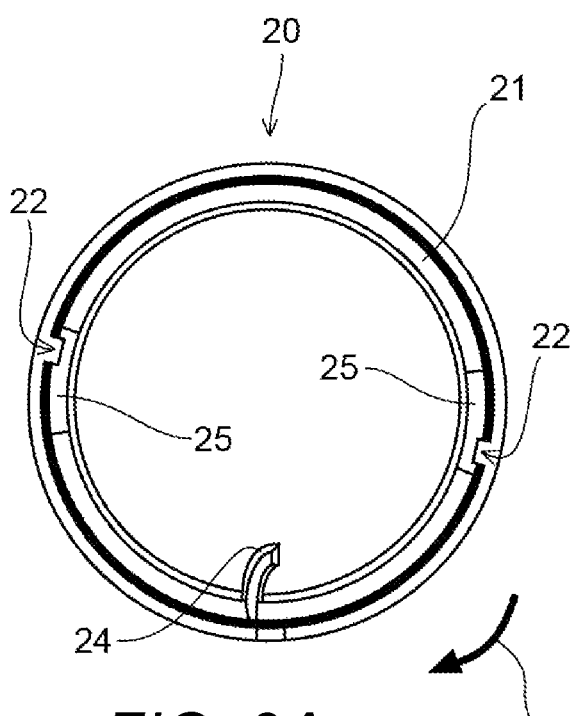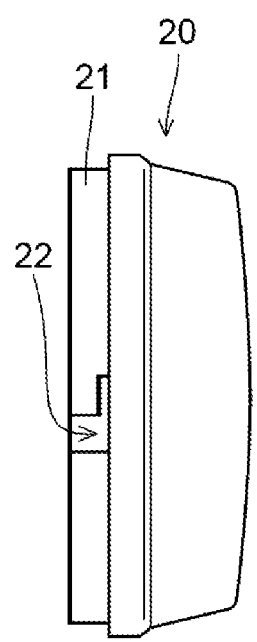
FIG. 9A  ENGAGING DIRECTION  FIG. 9B

LIGHTING DEVICE FOR VEHICLE

CROSS-REFERENCE TO RELATED APPLICATIONS

The present application claims priority under 35 U.S.C. §119 to Japanese Patent Application No. 2012-149802, filed Jul. 3, 2012. The contents of this application are incorporated herein by reference in their entirety.

BACKGROUND OF THE INVENTION

1. Field of the Invention

The present invention relates to a lighting device for a vehicle.

2. Discussion of the Background

Heretofore, a lighting device for a vehicle in which a hyaline or colored transparent lens that transmits light radiated by a bulb is attached to an opening of a housing like a container that holds the bulb as a light emitting source is known.

JP-Y No. 1991-18281 discloses a blinker (see FIG. 5) for a motorcycle in which a lens is fixed to a housing by providing a through hole to a flange provided to a rim of the lens and screwing a headed attaching screw that passes the through hole to the housing from the side of the lens.

SUMMARY OF THE INVENTION

According to one aspect of the present invention, a lighting device for a vehicle includes a lens, a housing, an engaging part, and an engaged part. The lens is to transmit light emitted from a bulb which is a light emitting source. The housing supports the bulb. The lens is attached to the housing. The engaging part is to attach the lens to the housing via a fastening member. The engaging part is provided on either one side of the lens or the housing. The engaged part is to attach the lens to the housing via the fastening member. The engaged part is provided on another side of the lens or the housing. The engaging part and the engaged part are configured to be a state in which the lens is fixed in a predetermined position by turning the lens by a predetermined angle with respect to the housing after the lens and the housing are fitted in a direction of an optical axis of the lens. An inside of the lens abuts, by screwing the fastening member to the housing when the lens is fixed in the predetermined position, on an end of the fastening member so that turning of the lens is disenabled even if it is tried to turn the lens in a direction in which the lens is disengaged from the housing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9A and 9B are a back view and a side view showing the lens;

DESCRIPTION OF THE EMBODIMENTS

Figure 1:
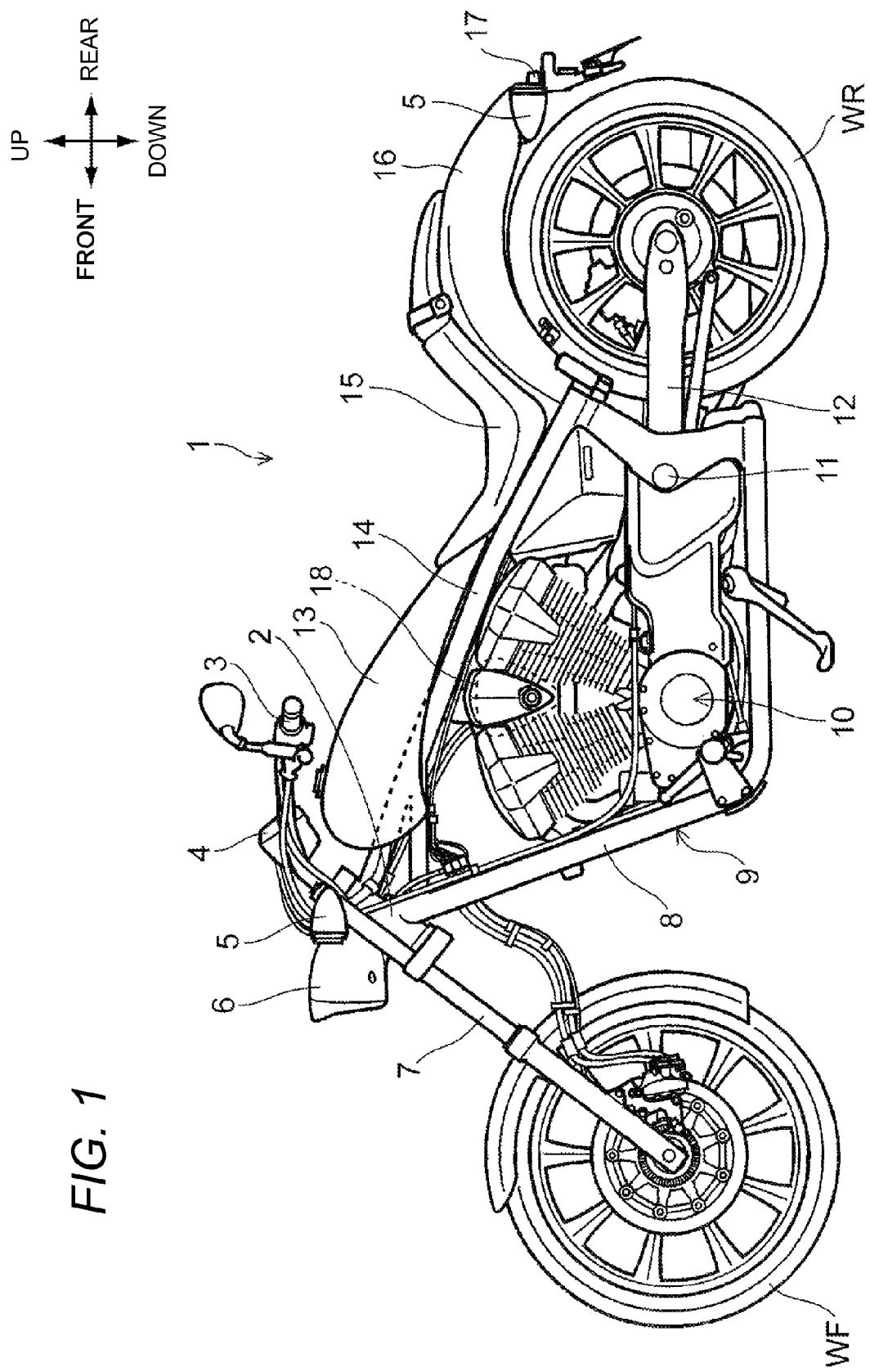
FIG. 1 is a left side view showing a motorcycle to which a blinker as a lighting device for a vehicle equivalent to one embodiment is applied.

The embodiments will now be described with reference to the accompanying drawings, wherein like reference numerals designate corresponding or identical elements throughout the various drawings.

FIG. 1 is a left side view showing a motorcycle 1 to which a blinker as a lighting device for a vehicle in one embodiment is applied. A steering stem (not shown) for enabling steering a pair of right and left front forks 7 is turnably supported by a head pipe 2 at a front end of a body frame 9. A front wheel WF is rotatably journaled to lower ends of the front forks 7, and a steering handlebar 3 and a meter 4 are attached to upper ends of the front forks 7. A headlight 6 is provided to the front side in a vehicle body of the head pipe 2 and a pair of right and left blinkers 5 as the lighting device for the vehicle according to the embodiment is attached to the right and left in a direction of vehicle width of the headlight 6.

A V-type 2-cylinder engine 10 is arranged between a main frame 14 and an under frame 8 respectively configuring the body frame 9. An intake system 18 including a fuel injection system and an air cleaner box is arranged between the front and rear cylinders of the engine 10. A pivot 11 that swingably journals a swing arm 12 is provided to the body frame 9 at the back of the engine 10 in the vehicle body. A rear wheel WR as a driving wheel is rotatably journaled to a rear end of the swing arm 12. The rotational driving force of the engine 10 is transmitted to the rear wheel WR via a shaft drive mechanism.

A fuel tank 13 is attached on the upside of the engine 10 across the main frame 18 and a seat 15 is arranged to a rear lower part of the fuel tank. A rear fender 16 is provided on the upside of the rear wheel WR at the back of the seat 15, and a tail lamp 17 and a pair of right and left blinkers 5 are attached to a rear end of the rear fender. In this embodiment, the blinkers 5 on the front side and the blinkers 5 on the rear side can be configured by common parts.

Figure 2:
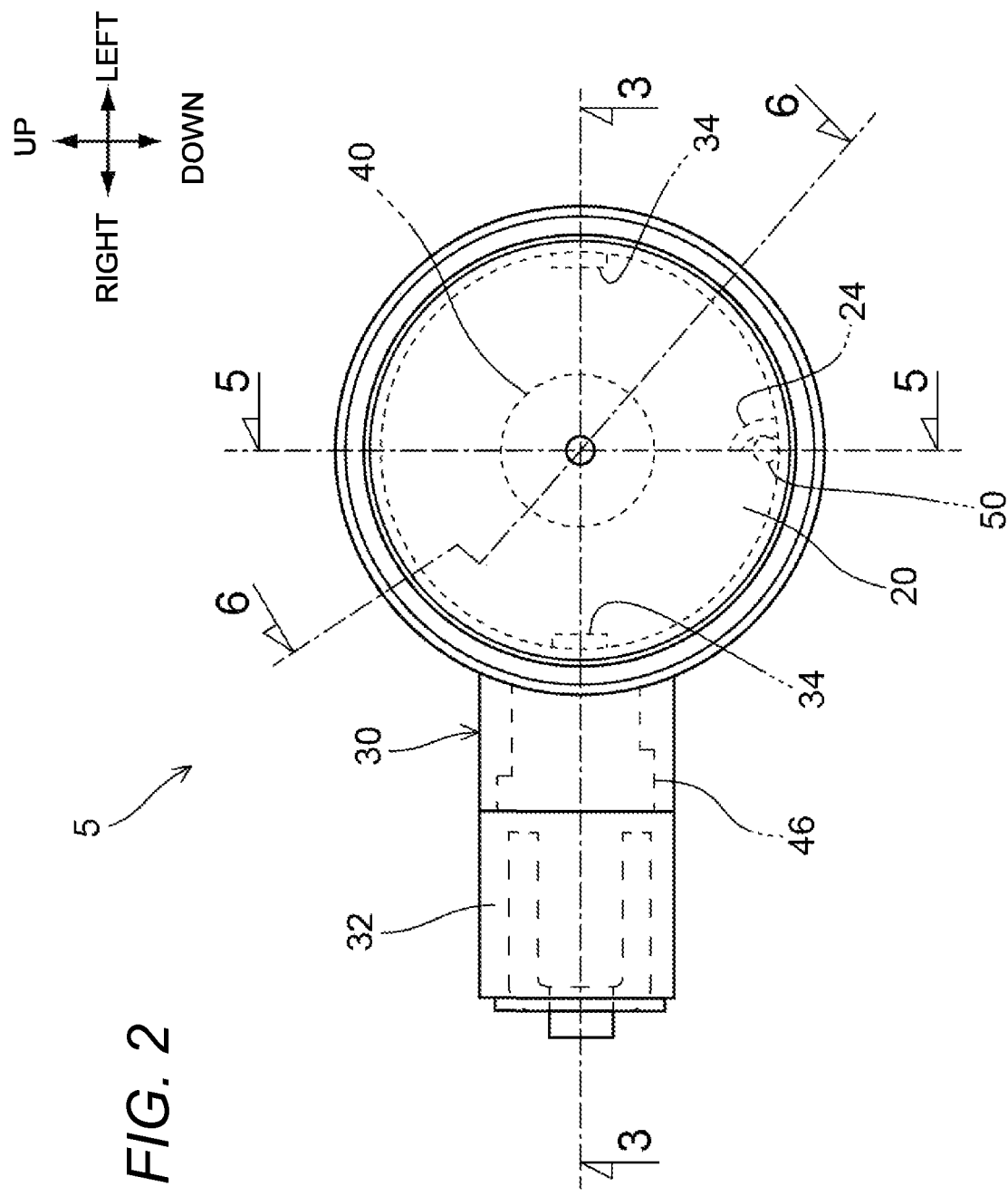
FIG. 2 is a front view showing the blinker.
Figure 3:
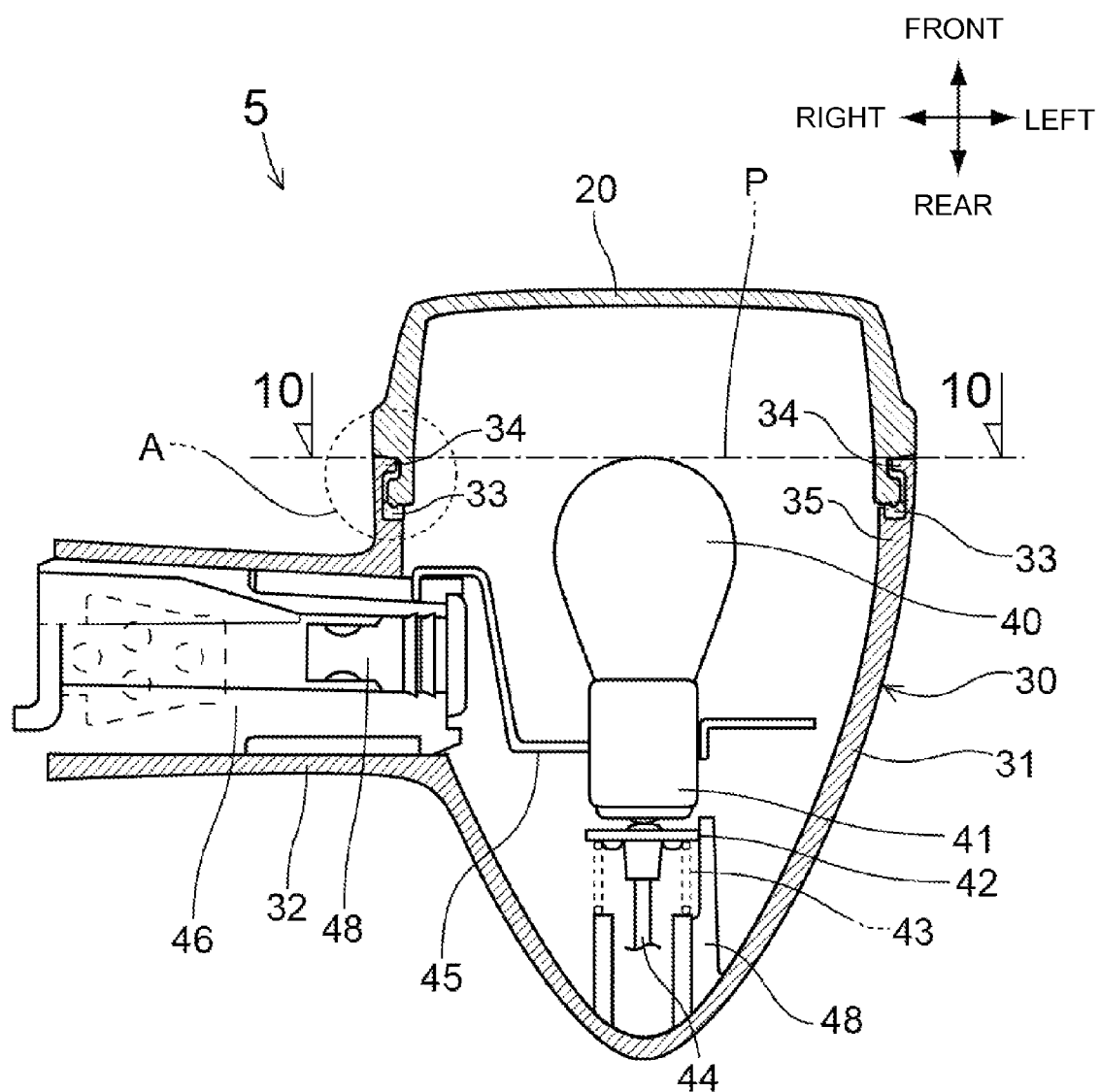
FIG. 3 is a sectional view viewed along line 3-3 in FIG. 2.
Figure 4:
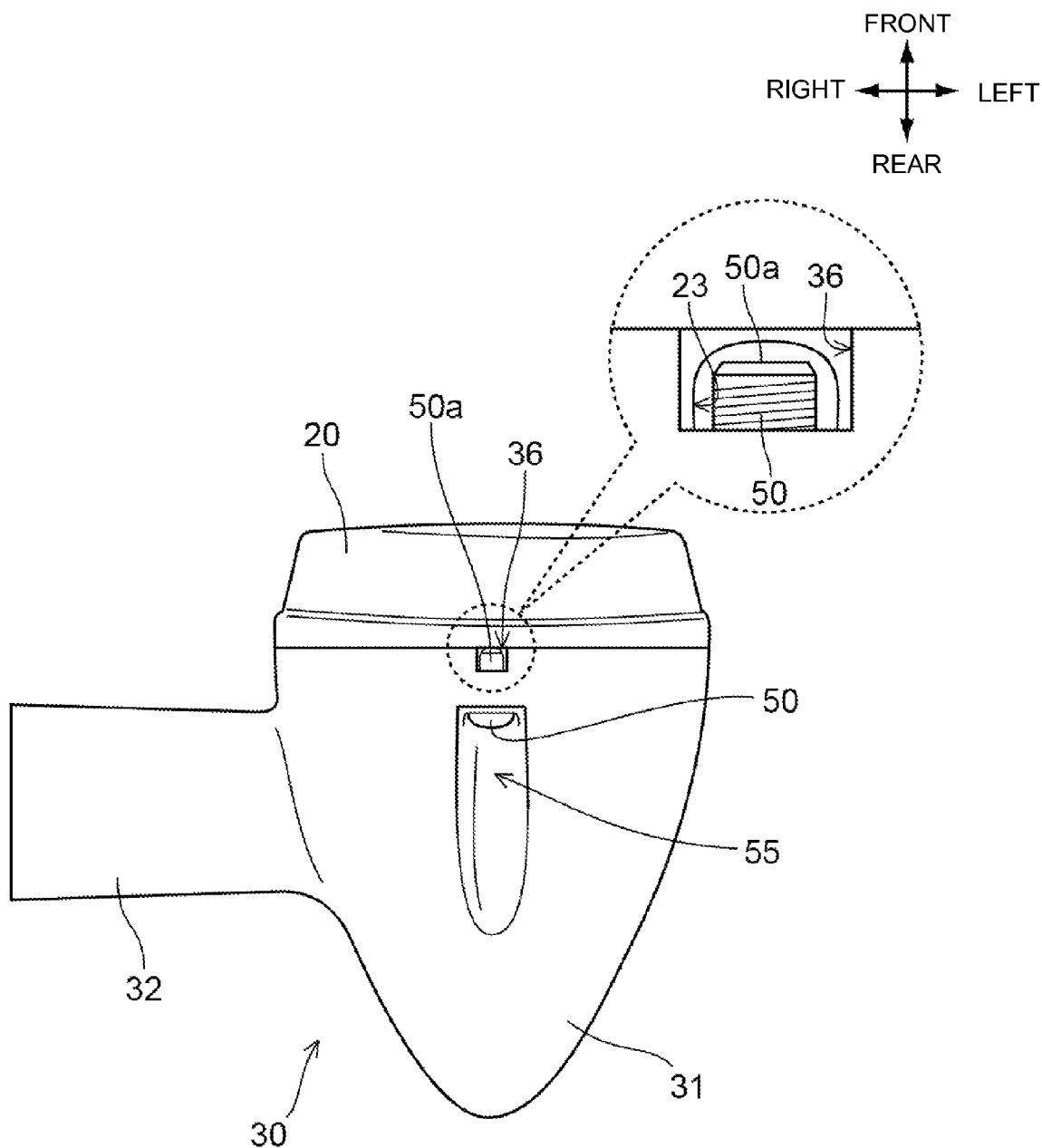
FIG. 4 is a bottom view showing the blinker.

FIG. 2 is a front view showing the blinker 5. Besides, FIG. 3 is a sectional view viewed along line 3-3 in FIG. 2 and FIG. 4 is a bottom view showing the blinker 5. The blinker 5 for the front side of the vehicle body is described as an example below; however, the blinker for the rear side of the vehicle body shall also have the same structure. The blinker 5 holds a bulb 40 as a light emitting source inside a housing 30 made of metal such as aluminum and a lens 20 that transmits light radiated by the bulb 40 is fixed to an opening of the housing 30.

The housing 30 is configured by a main body 31 like a container having a shape of a so-called shell and a cylindrical attachment to the vehicle body 32 for attaching to the vehicle body. In this embodiment, for the bulb 40, an incandescent lamp is applied and for the lens 20, orange transparent resin and others are applied; however, for example, a surface of the bulb 40 may be also colored in orange, for the lens 20, a hyaline clear type may be also used, and in place of the incandescent lamp, orange LED may be also applied.

The blinker 5 in this embodiment is characterized in fastening structure between the housing 30 and the lens 20. Concretely, the lens 20 is prevented from being detached from the housing 30 by screwing a fastening screw 50 as fastening means to only the housing 30 from the side of the housing 30 in a state in which the housing and the lens are mutually temporarily fastened by an engaging mechanism configured by an engaging protrusion as an engaging part and an engaged groove as an engaged part respectively provided to the housing 30 and the lens 20 without screwing the fastening screw 50 to the lens 20.

The lens 20 of the blinker 5 is in the shape of a bottomed cylinder which is a circular in a front view. A pair of right and left engaging protrusions 34 is formed on an inside face of the main body 31 of the housing 30 and are engaged into a pair of right and left engaged grooves 22 (see FIGS. 9A and 9B) formed in the lens 20. The engaged groove 22 is formed in a so-called L type in which the groove is bent at a right angle and when the lens 20 is attached to the housing 30, the lens 20 is fixed in a predetermined position by turning the lens 20 by a predetermined angle in a counterclockwise direction as shown in the drawing after the lens 20 is moved in a direction of an optical axis and is fitted to the opening of the housing 30 so that the engaging protrusion 34 and the engaged groove 22 are engaged.

When the fastening screw 50 is screwed toward the side of the lens 20 from the side of the housing 30, that is, from the rear side in the vehicle body toward the front side in the vehicle body in a state in which the lens 20 is fixed in the predetermined position, the fastening screw 50 that abuts on a locking plate 24 provided to the lens 20 as locking means functions as a stopper afterward and the lens 20 is prevented from being turned clockwise in the front view of the vehicle body. Accordingly, the lens 20 is fixed without screwing the fastening screw 50 to the lens 20, no tightening stress is caused in the lens 20, the fastening screw 50 is hardly viewed from the side of the lens 20, and the compact blinker 5 excellent in appearance quality is acquired.

Referring to FIG. 3, in the main body 31 of the housing 30, a supporting plate 45 that fixes a socket 41 of the bulb 40, an electrode plate 42 pressed on the socket 41 by the pressure of a spring 43 and a bottom wall 48 that regulates positions of the spring 43 and the electrode plate 42 are arranged. A harness 44 that supplies electric power to the electrode plate 42 is conducted on the side of the vehicle body through a hollow formed in a supporting member 46 inserted into the attachment to the vehicle body 32 of the housing 30 and a hollow of the bottom wall 48. An annular sealing member 33 is arranged between the main body 31 and the lens 20. Besides, as also shown in an enlarged view of a part A shown in FIG. 3, the engaging protrusion 34 on the side of the housing 30 is engaged into the engaged groove 22 formed in an annular part 21 of the lens 20 fitted to the side of the housing 30.

Referring to FIG. 4, there is provided a recessed portion 55 that functions as a guide when the fastening screw 50 is screwed and is provided to prevent the fastening screw 50 from being protruded from an outside face of the main body 31 after screwing in a position on the downside in the vehicle body of the main body 31 of the housing 30. A cutout for water drain on the housing side 36 is formed on the front side in the vehicle body of the recessed portion 55. In this bottom view, an end 50a of the fastening screw 50 is visible from the cutout for water drain on the housing side 36.

Figure 5:
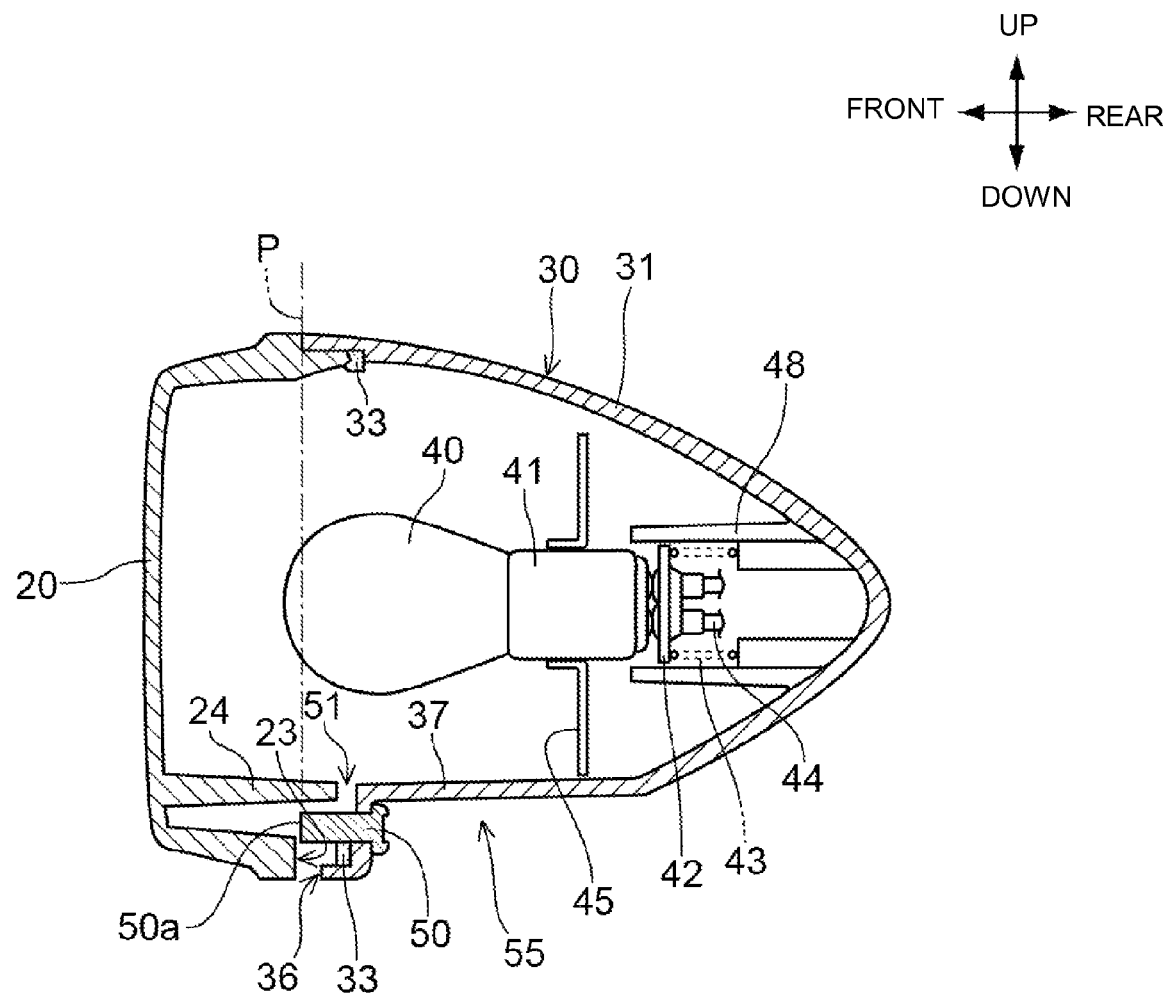
FIG. 5 is a sectional view viewed along line 5-5 in FIG. 2.
Figure 6:
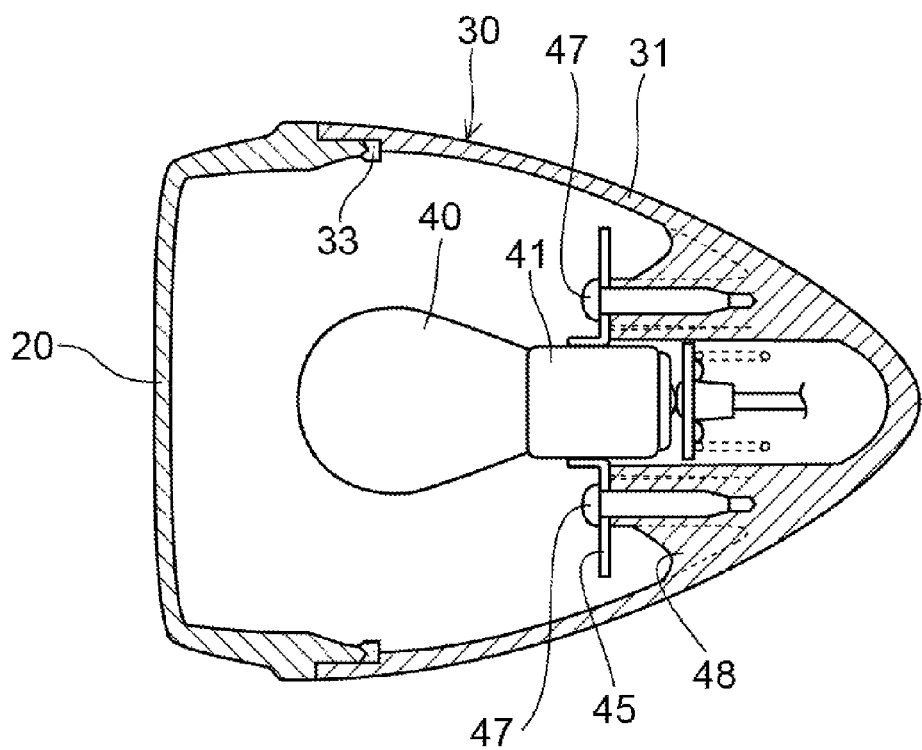
FIG. 6 is a sectional view viewed along line 6-6 in FIG. 2.
Figure 7:
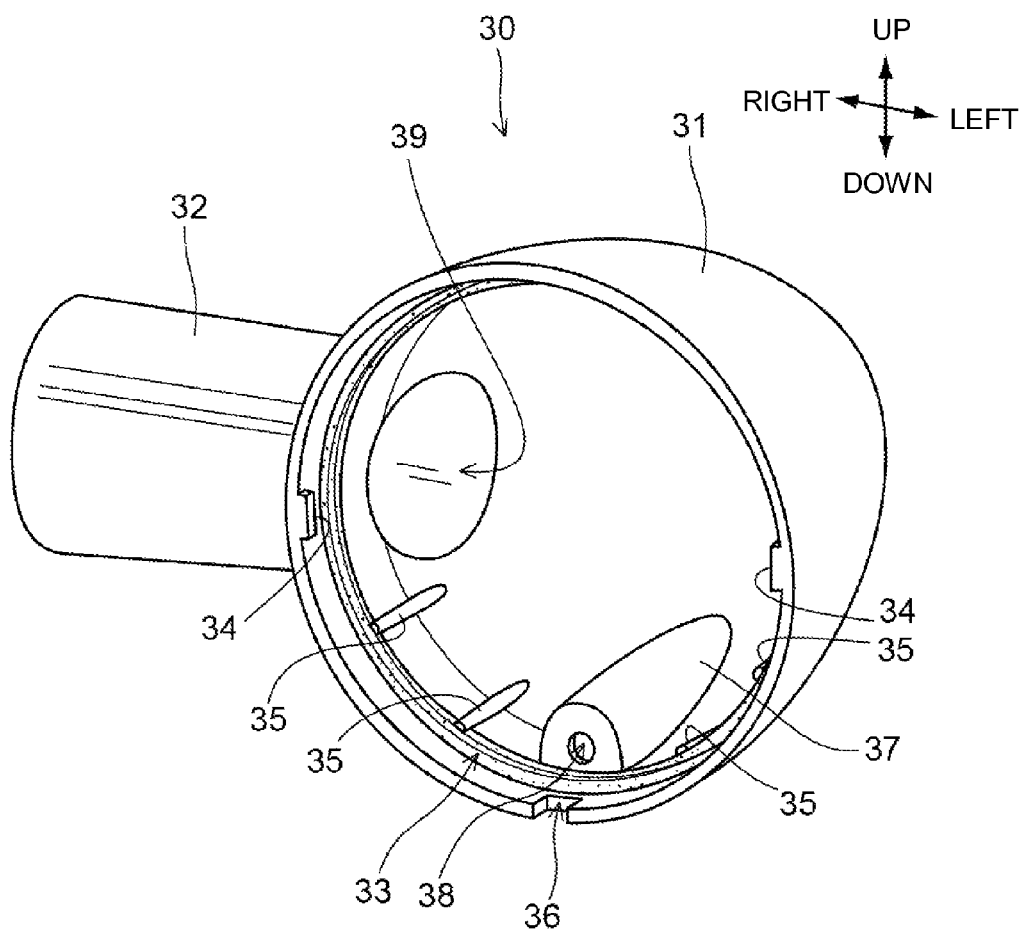
FIG. 7 is a perspective view showing a housing.
Figure 8:
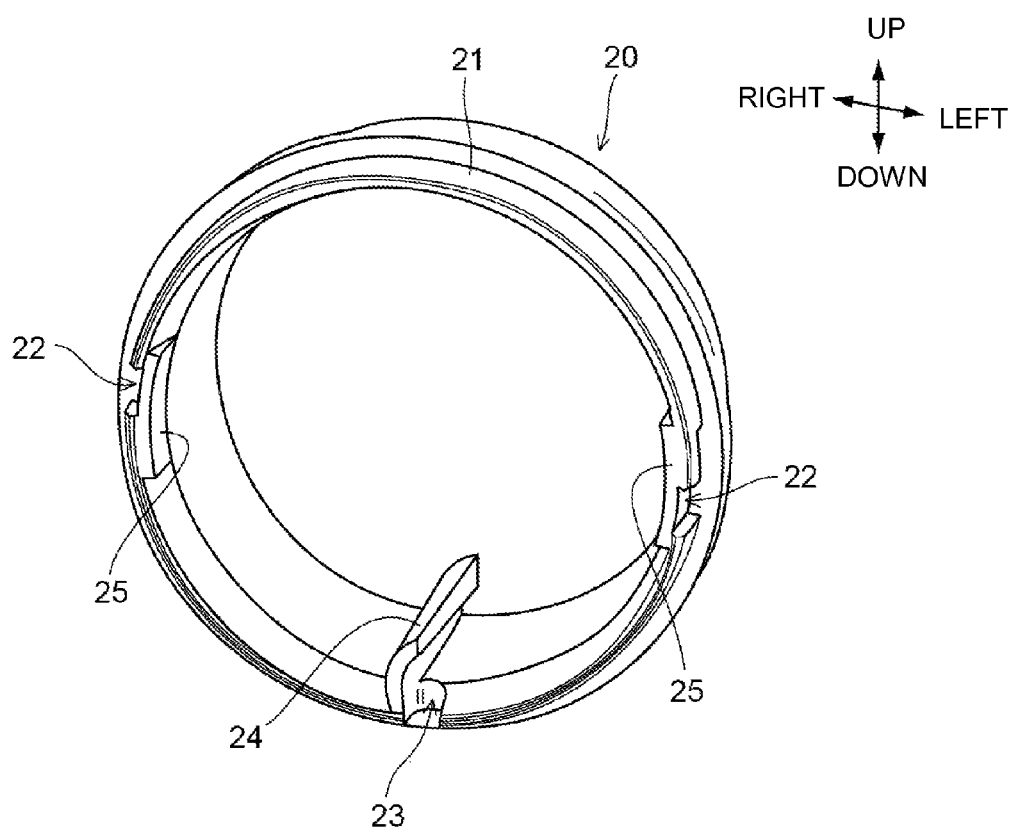
FIG. 8 is a perspective view showing a lens.

FIG. 5 is a sectional view viewed along line 5-5 in FIG. 2. Besides, FIG. 6 is a sectional view viewed along line 6-6 in FIG. 2, FIG. 7 is a perspective view showing the housing 30, FIG. 8 is a perspective view showing the lens 20, FIGS. 9A and 9B are a back view and a side view showing the lens 20. The same reference sign as the above-mentioned one denotes the same or similar part. The supporting plate 45 is fixed to the bottom wall 48 of the main body 31 of the housing 30 by two fixing screws 47.

Referring to FIG. 7, a projecting portion 37 equivalent to the back side of the recessed portion 55 is provided inside the main body 31 and a female screw hole 38 to which the fastening screw 50 is screwed is formed at one end of the projecting portion 37. When the fastening screw 50 is screwed to the female screw hole 38, the end 50a (see FIG. 4) is protruded toward the side of the lens 20. The annular sealing member 33 fitted to the main body 31 is fixed in a predetermined position by plural columnar ribs 35. A pair of right and left engaging protrusions 34 and the cutout for water drain on the housing side 36 are provided in positions closer to an end of the opening than the sealing member 33. The main body 31 and the attachment to the vehicle body 32 are an integrated part made of a thin metal plate and both communicate via a hollow 39.

Referring to FIG. 8, the annular part 21 extended on the side of the housing 30 from a contact area P and inserted on the side of the housing 30 is formed on the lens 20 and the engaged groove 22 into which the engaging protrusion 34 is engaged is formed on an outside face of the annular part 21. A thick part 25 for compensating thickness thinned by the engaged groove 22 is provided in a position inside the engaged groove 22 in a radial direction. A cutout for water drain on the lens side 23 and the locking plate 24 as the locking means are formed in positions inside the lens 20 and on the downside in the vehicle body. The cutout for water drain on the lens side 23 functions as a water drain hole for exhausting water content in the housing 30 outside. Besides, the locking plate 24 is provided with a function that prohibits the turning of the lens 20 by allowing to abut on the fastening screw 50 in screwing; however, when the lens 20 is fixed in the predetermined position and the fastening screw 50 is screwed, setting is made so that the end 50a of the fastening screw 50 is not touched to both the cutout for water drain on the lens side 23 and the locking plate 24.

The cutout for water drain on the lens side 23 is formed in the annular part 21. Besides, the locking plate 24 is stood inside the lens 20 so that the locking plate is extended at least on the side of the housing 30 through the abutting surface P of the housing 30 and the lens 20 and is formed so that the locking plate abuts on the side of the fastening screw 50. As the locking plate 24 is formed with it curved, it has high rigidity and further, as the locking plate is curved with it overhanging the cutout for water drain on the lens side 23, the intrusion of water, dust and others can be inhibited.

Referring to FIG. 5, a top face of the projecting portion 37 on the side of the housing 30 and a top face of the locking plate 24 on the side of the lens 20 are set to the substantially same height and clearance 51 is set between both. When water content intrudes inside the blinker 5, the water content is exhausted outside from a hole between the cutout for water drain on the housing side 36 formed on the housing 30 and an end face of the lens 20 after the water content passes slight clearance formed between the end 50a of the fastening screw 50 and the cutout for water drain on the lens side 23.

Figure 10:
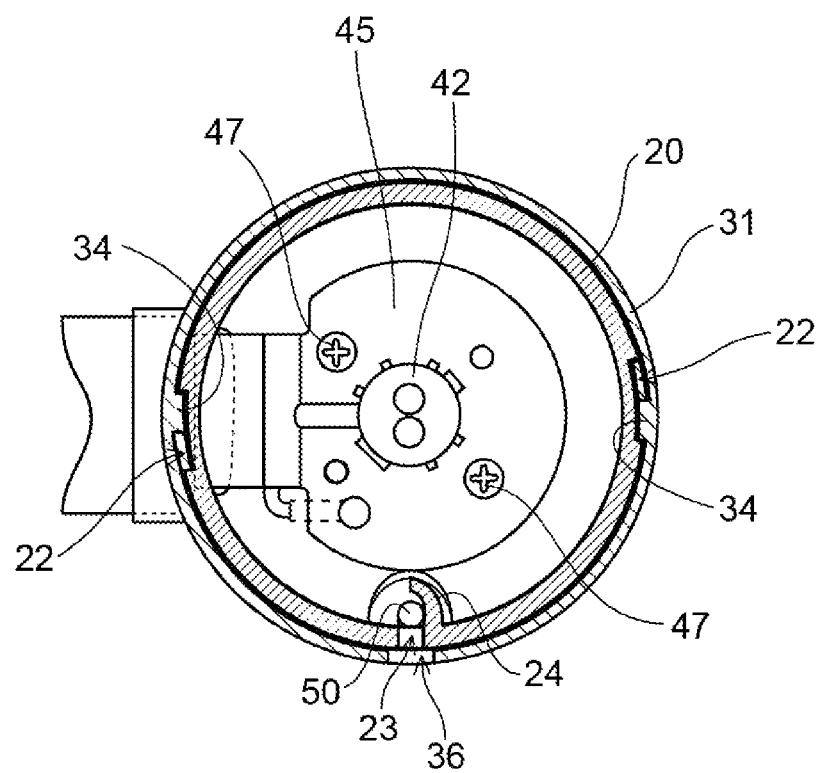
FIG. 10 is a sectional view viewed along line 10-10 in FIG. 2.

FIG. 10 is a cross section viewed along line 10-10 in FIG. 3. The same reference sign as the above-mentioned one denotes the same or similar part. As described above, when the lens 20 is engaged to the housing 30, the lens 20 is fixed in the predetermined position by inserting the lens 20 into the opening of the housing 30 from the front side in the vehicle body in accordance with a shape of the engaged groove 22 and next, turning the lens 20 counterclockwise in the front view of the vehicle body. As the fastening screw 50 interferes with the locking plate 24 and the lens 20 cannot be turned even if it is tried to turn the lens 20 clockwise when the fastening screw 50 is screwed to the housing 30 from the rear side in the vehicle body in this state, the lens 20 is substantially held in the predetermined position.

Figure 11:
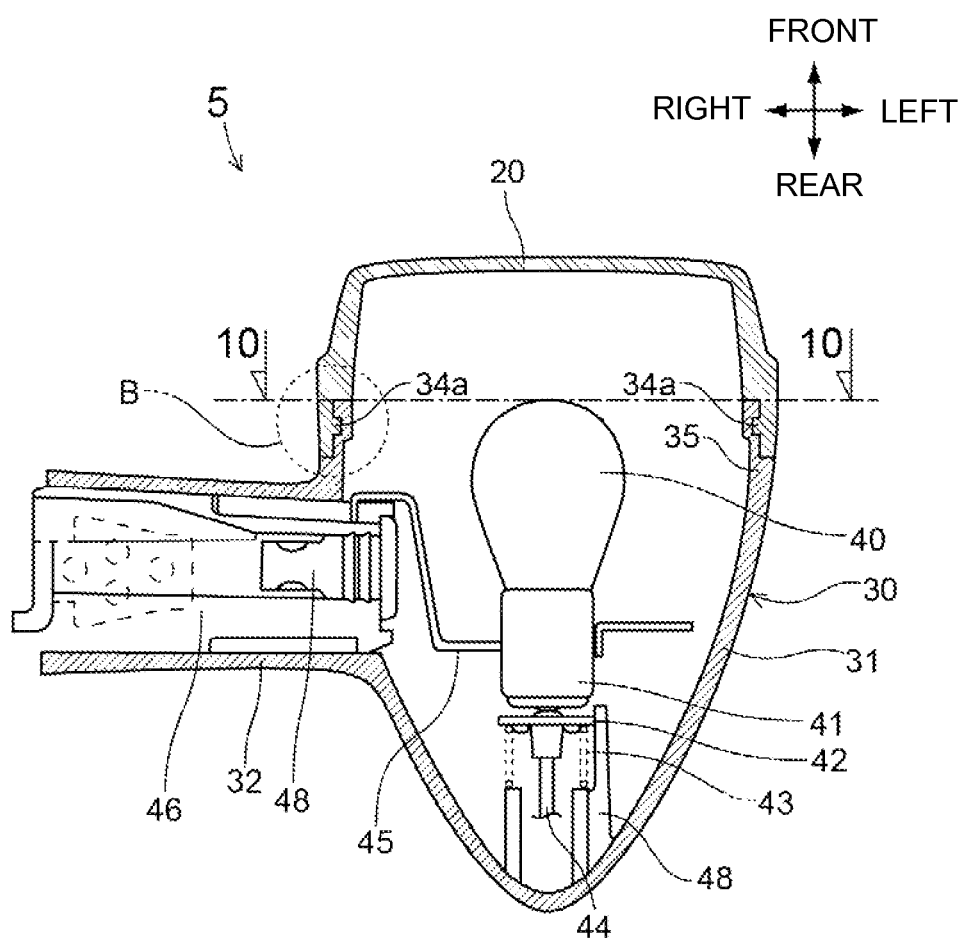
FIG. 11 is a sectional view showing a blinker in a variation of the embodiment.
Figure 12:
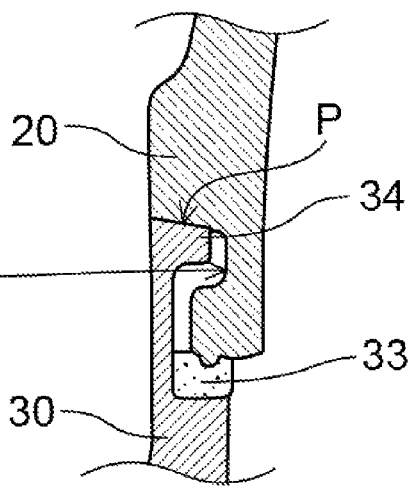
FIG. 12 is an enlarged view showing a part A shown in FIG. 3.
Figure 13:
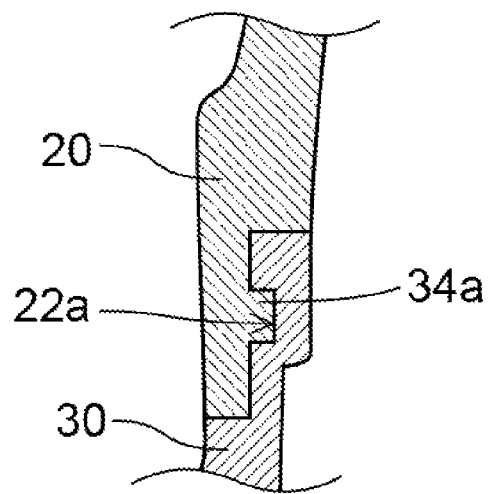
FIG. 13 is an enlarged view showing a part B shown in FIG. 11.

FIG. 11 is a sectional view showing a blinker 5a in a variation of the embodiment. The same reference sign as the above-mentioned one denotes the same or similar part. As also shown in an enlarged view showing a part B in FIG. 13, engaging structure configured by a housing 30 and a lens 20 may be also provided with an engaging protrusion 34a on the side of the lens 20 and an engaged groove 22a on the side of the housing 30. A hooked part caught when the lens is turned to a predetermined fixed position can be also provided to the engaged groove 22a and a helical shape in which distance with the housing decreases according to the turning of the lens can be also applied.

The material and shapes of the housing and the lens, the structure and shapes of an engaging part and an engaged part formed in the housing and the lens, a shape of locking means configured by a locking plate, a shape of a cutout for water drain, the material and a shape of a sealing member, the configuration and shapes of a female screw hole and a fastening screw are not limited to the above-mentioned embodiment and various changes are allowed. For example, for the locking plate abutting on the fastening screw, a pair of plates located on both sides of the fastening screw may be also provided and an annular plate encircling the fastening screw may be also provided. Besides, the housing may be also made of resin and for the fastening screw, a tapping screw may be also applied. Further, in place of the fastening screw and the female screw on the housing side, structure that a fastening pin provided with no screwing structure is fixed on the housing side by engaging structure may be also applied. The lighting device for the vehicle according to the present invention is not limited to the motorcycle and can be applied to various vehicles such as saddle-ride type three-wheeled vehicle and four wheel vehicle.

A lighting device for a vehicle according to a first aspect of an embodiment includes a lens (20) that transmits light from a bulb (40) which is a light emitting source, a housing (30) which supports the bulb (40) and to which the lens (20) is attached, and an engaging part (34) and an engaged part (22) respectively for attaching the lens (20) to the housing (30) via fastening means (50), and has a first characteristic that the engaging part (34) is provided on either side of the lens (20) or the housing (30), the engaged part (22) is provided on the other side of the lens (20) or the housing (30), the engaging part (34) and the engaged part (22) are configured so that the lens (20) is fixed in a predetermined position by turning the lens (20) by a predetermined angle for the housing (30) after the lens (20) and the housing (30) are fitted in a direction of an optical axis, the inside of the lens (20) abuts on an end (50a) of the fastening means (50) by screwing the fastening means (50) to the housing (30) when the lens (20) is fixed in the predetermined position and the turning of the lens (20) is disenabled even if it is tried to turn the lens (20) in a direction in which the engaging is released.

In a lighting device according to a second aspect of the embodiment, the fastening means (50) is a screwing member screwed to only the housing (30) from the side of the housing (30) toward the side of the lens (20).

In a lighting device according to a third aspect of the embodiment, a recessed portion (55) for preventing the screwed fastening means (50) from being protruded is formed on an outside face of the housing (30).

In a lighting device according to a fourth aspect of the embodiment, the recessed portion (55) is provided on the downside in a vehicle body of the housing (30).

In a lighting device according to a fifth aspect of the embodiment, locking means (24) that disenables the turning of the lens (20) by allowing the locking means to abut on the end (50a) of the fastening means (50) is provided inside the lens (20).

In a lighting device according to a sixth aspect of the embodiment, the end (50a) of the fastening means (50) is not protruded on the side of the lens (20) through an abutting surface (P) of the housing (30) and the lens (20) even if the fastening means (50) is screwed to the housing (30) is made and the locking means (24) is configured by a locking plate (24) stood inside the lens (20) so that the locking means is extended at least on the side of the housing (30) through the abutting surface (P) of the housing (30) and the lens (20) and abuts on the side of the fastening means (50).

In a lighting device according to a seventh aspect of the embodiment, the fastening means (50) is arranged on the downside in the vehicle body of the lighting device and a cutout for water drain on the lens side (23) and a cutout for water drain on the housing side (36) are formed in positions overlapped with the fastening means (50) in a bottom view of the lighting device in an abutting part of the housing (30) and the lens (20).

In a lighting device according to an eighth aspect of the embodiment, the locking plate (24) is curved.

According to the first aspect, as the engaging part is provided on either side of the lens or the housing, the engaged part is provided on the other side of the lens or the housing, the engaging part and the engaged part are configured so that the lens is fixed in the predetermined position by turning the lens by the predetermined angle for the housing after the lens and the housing are fitted in the direction of the optical axis, the inside of the lens abuts on the end of the fastening means and the turning of the lens is disenabled by screwing the fastening means to the housing when the lens is fixed in the predetermined position even if it is tried to turn the lens in the direction in which the engaging is released, the lens and the housing can be fixed without screwing the fastening means to the side of the lens and stress is prevented from being caused in the lens by the fastening means when the lens is attached to the housing. Hereby, as a fastened location on the lens side is not required to be increased so as to distribute stress, the lighting device can be miniaturized. Besides, as the fastening means has only to have strength for disenabling the turning of the lens, the fastening means can be miniaturized, the fastening means can be made inconspicuous, and the appearance quality can be enhanced.

According to the second aspect, as the fastening means is a screwing member screwed to only the housing from the housing side toward the lens side, the fastening means is made hardly visible from the outside of the lens and the appearance quality of the lighting device can be enhanced. Besides, as the fastening means is screwed substantially perpendicularly to a luminous surface of the lens, an effect which the fastening means has on the luminous surface is inhibited at a minimum and sufficient luminous area can be secured.

According to the third aspect, as the recessed portion for preventing the screwed fastening means from being protruded is formed on the outside face of the housing, the fastening member is made inconspicuous, the appearance quality is enhanced, and the lighting device can be prevented from being large-sized.

According to the fourth aspect, as the recessed portion is provided on the downside in the vehicle body of the housing, the recessed portion and the fastening means are made more inconspicuous and the appearance quality can be enhanced.

According to the fifth aspect, as the locking means that disenables the turning of the lens by allowing the locking means to abut on the end of the fastening means is provided inside the lens, the turning of the lens can be disenabled with simple configuration.

According to the sixth aspect, as the end of the fastening means is configured so that the end is prevented from being protruded on the lens side through the abutting surface of the housing and the lens even if the fastening means is screwed to the housing, the turning of the lens can be disenabled by the locking hole and the locking plate. Besides, as the locking means is configured by the locking plate stood inside the lens so that it is extended at least on the housing side through the abutting surface of the housing and the lens and abuts on the side of the fastening means, possibility that the fastening means is visible from the outside of the lens which is a transmissible member is also reduced and the appearance quality of the lighting device can be enhanced.

According to the seventh aspect, as the fastening means is arranged on the downside in the vehicle body of the lighting device and the cutout for water drain on the lens side and the cutout for water drain for the housing side are formed in the positions overlapped with the fastening means in the bottom view of the lighting device in the abutting part of the housing and the lens, water content in the housing can be readily drained by providing a water drain hole in a lower part of the lighting device. Besides, as the cutouts and the fastening means are overlapped in the bottom view, a substantial width of a passage as the water drain hole can be narrowed and the intrusion of water and dust from the outside can be inhibited. Further, as a thin location is also not required to be provided to a mold for forming the housing when the passage is set to be thinned, the maintenance cycle of the mold can be extended.

According to the eighth aspect, as the locking plate is curved, high rigidity is readily acquired and as the locking plate is curved with the locking plate overhanging the cutout for water drain on the lens side 23, the intrusion of water, dust and others can be inhibited.

Obviously, numerous modifications and variations of the present invention are possible in light of the above teachings. It is therefore to be understood that within the scope of the appended claims, the invention may be practiced otherwise than as specifically described herein.

What is claimed is:

1. A lighting device for a vehicle, comprising:
   a lens to transmit light emitted from a bulb which is a light emitting source;
   a housing which supports the bulb and to which the lens is attached;
   an engaging part to attach the lens to the housing via a fastening member, the engaging part being provided on either one side of the lens or the housing; and
   an engaged part to attach the lens to the housing via the fastening member, the engaged part being provided on another side of the lens or the housing, the engaging part and the engaged part being configured to be a state in which the lens is fixed in a predetermined position by turning the lens by a predetermined angle with respect to the housing after the lens and the housing are fitted in a direction of an optical axis of the lens, an inside of the lens abutting, by screwing the fastening member to the housing when the lens is fixed in the predetermined position, on an end of the fastening member so that turning of the lens is disenabled even if it is tried to turn the lens in a direction in which the lens is disengaged from the housing.

2. The lighting device for a vehicle according to claim 1, wherein the fastening member comprises a screwing member screwed to only the housing from the housing toward the lens.

3. The lighting device for a vehicle according to claim 2, wherein a recessed portion is provided on an outside face of the housing to prevent the fastening member screwed to the housing from being protruded.

4. The lighting device for a vehicle according to claim 3, wherein the recessed portion is provided on a downside of the housing when the lighting device is attached to a vehicle body.

5. The lighting device for a vehicle according to claim 1, wherein a locking member is provided inside the lens to prevent the lens from turning by allowing the locking member to abut on the end of the fastening member.

6. The lighting device for a vehicle according to claim 5,
   wherein the end of the fastening member is not protruded toward the lens through an abutting surface of the housing and the lens when the fastening member is screwed to the housing, and
   wherein the locking member includes a locking plate provided inside the lens to extend at least toward the housing through the abutting surface of the housing and the lens, the locking plate abutting on a side surface of the fastening member.

7. The lighting device for a vehicle according to claim 1,
   wherein the fastening member is arranged on a downside of the lighting device when the lighting device is attached to a vehicle body,
   wherein a first cutout for water drain on a lens side is provided at a position at which the first cutout overlaps with the fastening member in a bottom view of the lighting device in an abutting part of the housing and the lens, and
   wherein a second cutout for water drain on a housing side is provided at a position at which the second cutout overlaps with the fastening member in the bottom view of the lighting device in the abutting part of the housing and the lens.

8. The lighting device for a vehicle according to claim 6, wherein the locking plate is curved.

* * * * *